United States Patent Office 2,864,849
Patented Dec. 16, 1958

2,864,849

THIOPHOSPHORIC ACID ESTERS AND THEIR PRODUCTION

Gerhard Schrader, Opladen, Germany, assignor to Farbenfabriken Bayer Aktiengesellschaft, Leverkusen, Germany, a corporation of Germany No Drawing. Application August 28, 1956
Serial No. 606,554

Claims priority, application Germany September 7, 1955

7 Claims. (Cl. 260—461)

This invention relates to a class of new and useful thiophosphoric acid esters of the following general formula:

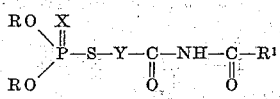

wherein R stands for a hydrocarbon (preferably lower alkyl) radical, X means either oxygen or sulfur, Y stands for an alkylene (preferably lower alkylene) chain and $R^1$ may be an alkoxy or aryloxy radical.

Thiophosphoric acid ester derivatives have become very important pesticides during the recent years, and a considerable amount of work has been done in this field. Nevertheless, there are still needed more effective and less toxic compounds, especially such compounds which excel additionally in their systemic action on the plant.

Therefore, it is a principal object of the present invention to provide a new and useful class of thiophosphoric-acid esters. Another object is to provide a method for preparing these compounds; still further objects will become apparent as the following description proceeds.

In accordance with the invention, it has been found that compounds of the above formula may be obtained by reacting salts of O,O-dialkyl-thiol-(or thiono-thiol) phosphoric acids with halo-acyl-urethanes. This reaction may typically be shown by the following equation:

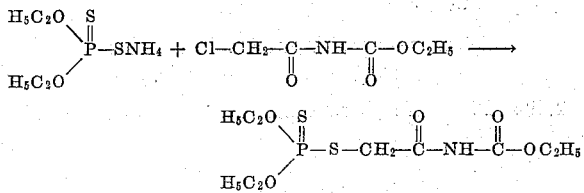

using the ammonium salt of O,O-diethyl-dithiophosphoric acid and chloroacetyl-urethane as starting materials.

Instead of salts at the diethyl-dithiophosphoric acid ester, however, also salts of other esters, such as of the dimethyl, dipropyl, dibutyl, diamyl, diphenyl or dicyclohexylester may be used. Also other alkali metal salts such as sodium or potassium salt are suitable reactants in this reaction. Moreover, the thiol-esters may be used instead of thiono-thiol esters. Instead of chloro-acetyl-urethane also other halo-acyl compounds such as bromopropionyl, urethane may be used. Also other esters of the urethane series (i. e. other amino-carbonic-acid-esters) such as the methyl, propyl, butyl, etc. esters may be used according to the present invention.

The reaction generally may be carried out at temperatures from about 0° to about 150° C. especially in a range from about 30° to about 90° C., preferably with the thiol phosphoric acid ester reactant in salt form. If salts of thiol- or thiono-thiol-phosphoric acid—O,O-diesters are used, the reaction preferably is carried out by adding a solution of this salt to a solution of the halo-acyl-urethane. Solvents which are suitable for the condensation typically include water or inert organic solvents such as liquid hydrocarbons, alcohols, ketones, nitriles, etc. and more specifically benzene, toluene, hexane, methanol, ethanol, isopropanol, acetone, methyl-ethyl ketone, acetonitrile, etc. Compatible mixtures of these solvents may, of course, be utilized. The reaction, however, may also be carried out by dissolving the haloacyl-urethanes and the free O,O-diester-thiophosphoric acid in an inert organic solvent, especially in lower aliphatic alcohols such as methanol or ethanol and then by adding organic or preferably inorganic basic substances such as sodium hydroxide, sodium carbonate, sodium or potassium alcoholate, trimethylamine, etc. to said solutions, thereby splitting off the halogen from the haloacyl-urethanes and forming the desired inventive new thiophosphoric acid esters.

The compounds of the present invention exhibit very good biological activity, while having a remarkable low toxicity against mammals. They may widely be used as insecticides against e. g. flies, mites and especially against aphids. The application proceeds in the usual way for the use of phosphor-insecticides, i. e. preferably the compounds may be dissolved or diluted with liquid or solid carriers, such as water, alcohols, liquid hydrocarbons, ketones or chalk talks, bentonite, etc. These compositions or the new compounds may be sprayed or dusted e. g. as aerosols or otherwise brought in contact with pests or plants whereon the pests are living, normally in concentrations from about 0.0001 to 1.0%.

The following examples are given by way of illustrating this invention, without, however, restricting it thereto:

Example 1

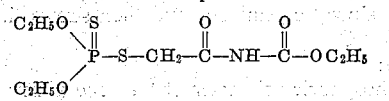

168 g. of chloroacetyl-urethane and 186 g. of O,O-diethylthiothiono-phosphoric acid are dissolved in 1100 ccm. of ethanol. At a temperature of 45° C. there are added 1000 ccm. of an n/1 sodium hydroxide solution. After the addition has been completed the resulting reaction mixture is filtered off from some impurities and then diluted with 1200 ccm. of water. The reaction product thereby precipitates in crystalline form. After filtering off and drying there are obtained 210 g. (70% of the theory) of the melting point 73° C.

If instead of chloroacetylurethane the corresponding amount of α-chloropropionylurethane is used there is obtained the ester of the formula:

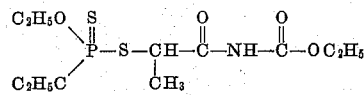

Example 2

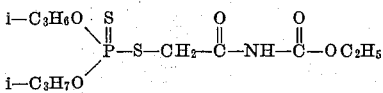

16.8 g. of chloroacetyl-urethane are dissolved in 150 ccm. of methylethyl-ketone. At a temperature of about 60° C. there is added slowly a solution of 23.5 g. of the ammonium salt of O,O-diisopropyl-thiol-thiono-phosphoric acid in 150 ccm. of methylethyl ketone. After standing at this temperature of 60° for a further hour the reaction mixture is diluted with about 4 to 5 times of water. After standing for a short time the reaction product crystallizes. The solution is filtered by suction and the crystalline residue is dried. There are obtained 25 g. (about 65% of the theory) of the melting point 40° C.

Example 3

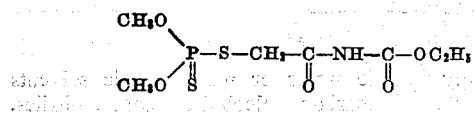

167 g. of chloroacetyl-urethane are dissolved in 350 ccm. of methanol. While stirring there are added 180 g. of the sodium salt of O,O-dimethyl-thiol-thiono-phosphoric acid, dissolved in 300 ccm. of water, at a temperature of about 80° C. After stirring for a further hour at this temperature, the reaction mixture is diluted with 500 ccm. of cold water. The reaction product precipitates as an oil which is taken up in 400 ccm. of benzene. The benzene layer is washed twice with 25 ccm. of water, dried over sodium sulfate and the solvent then is distilled off. The oily residue slowly crystallizes and then melts at 45° C. There are obtained 160 g. of colorless crystals.

Example 4

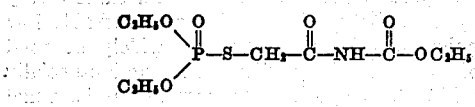

76 g. of the ammonium salt of O,O-diethyl-thiol-phosphoric acid are dissolved in 200 ccm. of methylethyl-ketone. At a temperature of about 75° C. there are added 66 g. of chloroacetylurethane, dissolved in 200 ccm. of methylethyl-ketone. The mixture is kept at this temperature for further 1½ hours, then cooled and filtered off from precipitated ammonium chloride. After evaporating the solvent the residue is taken up in chloroform. This solution is washed with water and finally dried over sodium sulfate. After distilling off the solvent there are obtained 75 g. of the crude ester (83% of the theory). The ester slowly crystallizes and then shows the melting point of 44° C.

I claim:
1. A phosphoric acid ester of the general formula

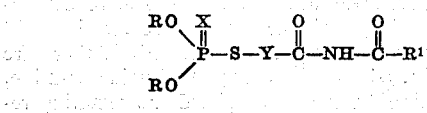

in which R stands for a lower alkyl radical, X stands for a member selected from the group consisting of oxygen and sulfur, Y stands for lower alkylene and $R^1$ is a lower alkoxy radical.

2. A method of preparing a phosphoric acid ester of the general formula

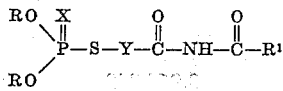

in which R stands for a lower alkyl radical, X stands for a member selected from the group consisting of oxygen and sulfur, Y stands for lower alkylene and $R^1$ is a lower alkoxy radical, which comprises reacting a member selected from the group consisting of the ammonium salt and alkali metal salt of the corresponding O,O-dialkyl ester of a thiol-phosphoric acid and a haloacylurethane in an inert solvent and recovering the product formed.

3. The phosphoric acid ester of the formula:

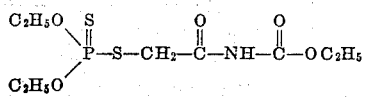

4. The phosphoric acid ester of the formula:

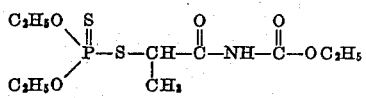

5. The phosphoric acid ester of the formula:

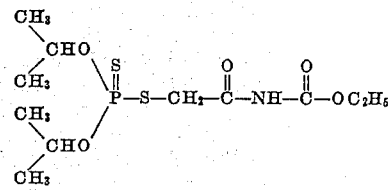

6. The phosphoric acid ester of the formula:

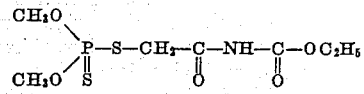

7. The phosphoric acid ester of the formula:

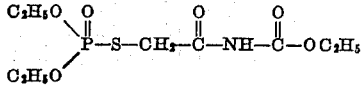

References Cited in the file of this patent
UNITED STATES PATENTS
2,494,126   Hoegberg _____ Jan. 10, 1950